(No Model.)
J. C. McCOLLUM.
HORSE AND CATTLE FETTER.
No. 283,503. Patented Aug. 21, 1883.
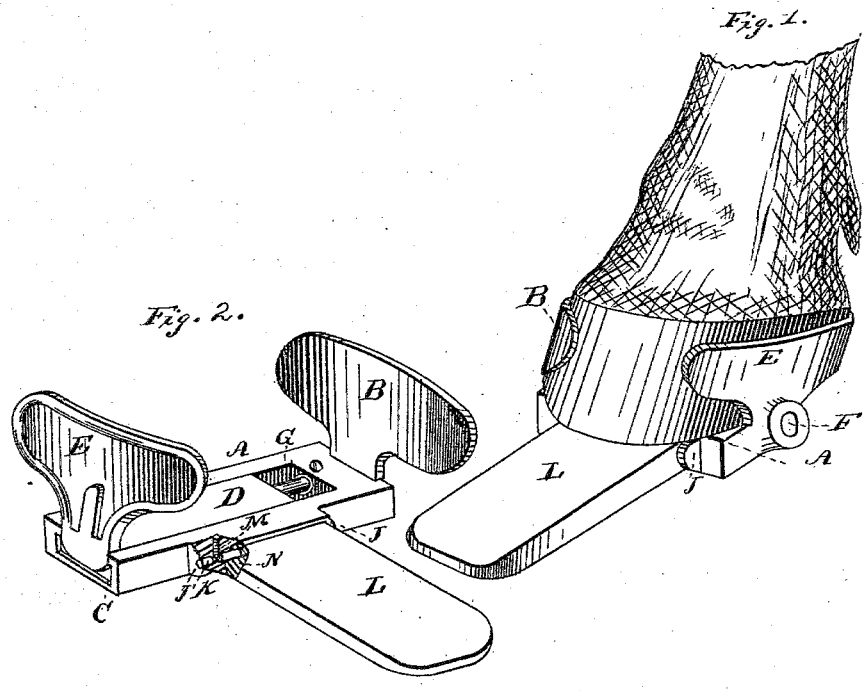
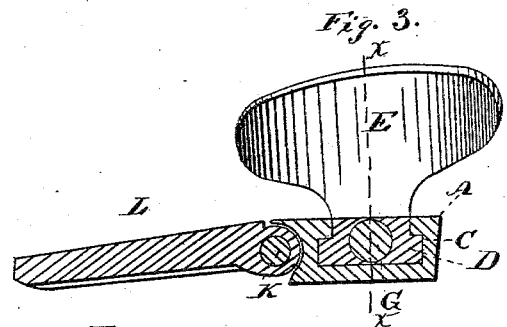
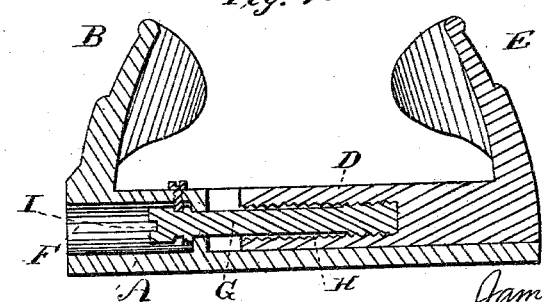
WITNESSES
Chas. R. Burr
Geo. H. Harvey
James C. McCollum
INVENTOR
by C. A. Snow & Co.
Attorney

United States Patent Office.

JAMES CALVIN McCOLLUM, OF LOS ANGELES, CALIFORNIA, ASSIGNOR TO H. H. BIXBY, OF SAME PLACE.

HORSE AND CATTLE FETTER.

SPECIFICATION forming part of Letters Patent No. 283,503, dated August 21, 1883.

Application filed April 17, 1883. (No model.)

*To all whom it may concern:*

Be it known that I, JAMES C. McCOLLUM, a citizen of the United States, residing at Los Angeles, in the county of Los Angeles and State of California, have invented a new and useful Horse and Cattle Fetter, of which the following is a specification, reference being had to the accompanying drawings.

This invention relates to fetters for horses and cattle, having for their object to prevent their straying or being stolen by interfering with rapid movement on the part of the animal wearing one or more of these fetters; and it consists in certain improvements in the construction of the same, which will be hereinafter fully described, and particularly pointed out in the claims.

In the drawings hereto annexed, Figure 1 is a perspective view, showing one of my improved fetters in position upon a horse's hoof. Fig. 2 is a perspective view of the fetter detached. Fig. 3 is a vertical longitudinal sectional view of the same. Fig. 4 is a vertical transverse sectional view on the line $x$ $x$ in Fig. 3.

The same letters refer to the same parts in all the figures.

A in the drawings designates the base-plate of my improved horse and cattle fetter, which is a simple rectangular or other suitably-shaped plate, having at one end a curved or convex plate or clasp, B, adapted to embrace one side of a hoof. The plate A is provided with a transverse, dovetailed, or flanged groove, C, in which is fitted a slide, D, having at its outer end a plate or clasp, E, corresponding to the clasp B of the base-plate A. The solid end of the base-plate A has a cylindrical recess, F, in the bottom of which is journaled a screw, G, which extends into a screw-threaded recess, H, in the slide D. The end of the screw has a notch, I, to receive an ordinary screw-driver, by means of which it may be operated. It will be seen that by turning the screw the slide D may be moved in or out to any desired extent, the screw serving also to retain it securely in any position to which it may be adjusted. The front side of the plate A is provided with a pair of lugs, J J, to receive a transverse pin, K, on which is hinged a plate or wing, L, extending forwardly from the base-plate A. This hinge-pin is held in place by a screw, M, inserted from the top of the base-plate and entering a groove, N, in the pin.

The operation of this invention will be readily understood from the foregoing description, taken in connection with the drawings hereto annexed. By turning the screw G the slide D may be moved outwardly, thus separating the clasps B and E until the device may be slipped over the hoof of the animal upon which it is to be adjusted. The screw is then reversed, thereby drawing the clasps together and clamping the device securely upon the hoof. The hinged wing or plate L will impede the motion of the animal wearing the fetter, preventing it from jumping fences, or from straying away to any considerable distance. The motion is likewise impeded by the weight of the fetter.

It will be observed that when the fetter is in position upon the hoof of an animal the hoof covers the screw M, which serves to hold the hinge-pin in position. It will thus be impossible for cattle-thieves to remove the pin and the hinged plate. It is also my intention to use in connection with this device a suitable lock adapted to be fitted in the recess F, so as to prevent access to the screw G, for the purpose of preventing unauthorized persons from removing the fetter. An improved lock, specially adapted for this purpose, will be the subject of a separate application for Letters Patent to be filed by me.

I claim and desire to secure by Letters Patent of the United States—

1. In an animal-fetter, the combination of a base-plate having a clasp and provided with a cylindrical recess at one end, a screw journaled in the bottom of said recess, and a slide moving in a groove in said plate, and having a clasp at its outer end and a threaded opening at its inner end to receive the operating-screw, and a wing or tongue hinged to the front side of the base-plate, as set forth.

2. In an animal-fetter, the combination, with a plate equipped with mechanism, substantially as described, for attaching it to the hoof of the animal, of a wing or tongue hinged to the front side of said plate, substantially as set forth.

3. In an animal-fetter, the combination of a suitable base-plate, means for securing the same to the hoof of an animal, lugs projecting forwardly from said plate, a wing or tongue hinged upon a pin between said lugs, and a screw inserted from the top of the base-plate and entering a groove in the hinge-pin, which is thereby held securely in position, as and for the purpose set forth.

In testimony that I claim the foregoing as my own I have hereto affixed my signature in presence of two witnesses.

JAMES CALVIN McCOLLUM.

Witnesses:
   SERENO S. CHAFFE,
   W. H. GOULD.